United States Patent [19]

Kreider et al.

[11] Patent Number: 4,799,842
[45] Date of Patent: Jan. 24, 1989

[54] WELD STUD

[75] Inventors: Hans Kreider, Wettenberg; Manfred Mueller, Wetzlar, both of Fed. Rep. of Germany

[73] Assignee: Emhart Enterprises Corp., Farmington, Conn.

[21] Appl. No.: 40,968

[22] Filed: Apr. 21, 1987

[30] Foreign Application Priority Data

Apr. 21, 1986 [DE] Fed. Rep. of Germany ..... 36133973
Jun. 5, 1986 [DE] Fed. Rep. of Germany ..... 36189022

[51] Int. Cl.$^4$ ............................................. F16B 37/06
[52] U.S. Cl. ................................... 411/171; 411/374; 411/371; 411/435
[58] Field of Search .................. 411/171, 371–373, 411/375, 377, 430–431, 374, 429, 914, 908, 409, 435, 407, 402; 219/98, 99; 81/121.1

[56] References Cited

U.S. PATENT DOCUMENTS

| 1,368,723 | 2/1921 | Helvig | 411/372 X |
| 1,397,235 | 11/1921 | Sabel | 411/372 X |
| 1,506,005 | 8/1924 | Kraft | 411/373 X |
| 1,582,862 | 4/1926 | Zarobsky | 411/431 X |
| 2,583,868 | 1/1952 | Mociun | 411/171 X |
| 2,983,181 | 5/1961 | Sholle | 411/371 |
| 3,279,517 | 10/1966 | Logan | 411/171 |
| 3,300,929 | 1/1967 | Fischer | 411/373 X |
| 4,397,437 | 8/1983 | Madet | 411/431 X |
| 4,557,654 | 12/1985 | Masuda et al. | 411/373 X |
| 4,582,462 | 4/1986 | Thiel | 411/431 X |

FOREIGN PATENT DOCUMENTS

| 905344 | 7/1972 | Canada | 411/431 |
| 2242870 | 3/1974 | Fed. Rep. of Germany | 411/373 |
| 2532252 | 7/1975 | Fed. Rep. of Germany . | |
| 8125649 | 9/1981 | France . | |

OTHER PUBLICATIONS

Ohio Weld Fasteners—1963.

Primary Examiner—Gary L. Smith
Assistant Examiner—Curtis B. Brueske
Attorney, Agent, or Firm—Thomas S. Szatkowski

[57] ABSTRACT

A weld stud having a cylindrical section permitting engagement by a stud welding gun, joined by a shoulder on to a threaded shank covered up to the shoulder by a cap nut made of plastics, wherein the cylinder section changes through a chamfer into a shoulder and the cap nut is provided with a resilient lip, which stretches to cover the chamfer when the cap nut is brought into contact with the shoulder. The threaded shank may have a ridge close to the shoulder which engages in a corresponding annular recess inside the cap nut. The cap nut may have a coaxial, preferably conical, projection at its end opposite the lip.

3 Claims, 1 Drawing Sheet

U.S. Patent     Jan. 24, 1989     4,799,842

WELD STUD

BACKGROUND OF THE INVENTION

The present invention relates to a weld stud having a cylindrical section permitting engagement by a stud welding gun, joined by a shoulder on to a threaded shank covered up to the shoulder by a cap nut made of plastics.

Known stud welding assemblies of this kind have a thread within the region of the shank of the weld stud, which is adapted for the assembly of a structural member at a later time and serves for the attaching of the can nut which, when screwed on to the weld stud, runs with its flat end face up against a flat shoulder face at the end of the thread and, as a function of the force with which the cap nut is screwed thereon, is pressed more or less firmly against the shoulder. A weld stud designed in this way may be welded to any structural member, for which a known stud welding gun can be used, which engages the weld stud in its region between the shoulder and the end face to be welded by means of gripping jaws, so that a weld stud provided with a cap nut can be held securely on the one hand while ensuring the necessary contact making with the weld stud on the other hand. In order not to obstruct the jaws of the weld gun in their gripping operation, the region of the weld stud before the shoulder has the same outside diameter as the cap nut. Weld studs designed in this way are obtainable commercially; they are also welded on in this manner in order to ensure that, for instance in a subsequent spraying operation for covering the structural member with a coat of paint, e.g. for the body of a motor vehicle, the paint cannot reach the threaded area of the weld stud, so that, if in the course of assembly a structural member is to be screwed on to the weld stud, the cap nut is unscrewed, whereupon the structural member is presented with a clean thread, free of any paint. It has however become evident that, because the cap nut is often screwed more or less tight, the tightness of the aforementioned end faces, which abut each other, is not always ensured. Sometimes, therefore, as a result of a gap remaining between the said end faces, possibly caused by vibration during transport or during the processing, paint can penetrate under the cap nut and thus contaminate the thread of the weld stud.

It is an object of the present invention to design a weld stud with a cap nut such that, with the cap nut screwed on reliable sealing of the thread is assured without imposing special demands on the force required for tightening the cap nut.

BRIEF DESCRIPTION OF THE INVENTION

According to the present invention we provide a weld stud having a cylindrical section, for engagement by a stud welding gun, joined by a shoulder on to a threaded shank covered up to the shoulder by a cap nut made of plastics, wherein the cylindrical section changes through a chamfer into a shoulder and the cap nut is provided with a resilient lip, which stretches to cover the chamfer when the cap nut is brought into contact with the shoulder.

Immediately upon impingement of the resilient lip upon the chamfer, a sealed joint is obtained at this point which is not altered significantly when the cap nut is further tightened because of the stretching of the lip; thus a fully-tight joint is achieved over a turning range of the cap nut because of the lip being stretched more or less. It is therefore not essential for the cap nut to be particularly firmly tightened.

Preferably the threaded shank close to the shoulder is provided with a ridge, which engages in an annular recess in the cap nut. The screwed-on cap nut is thus retained securely on the threaded shank and cannot become loose on its own during transport or when exposed to vibrations. In order to enable the cap nut to be more easily separated from the threaded shank, the ride may advantageously be formed like a thread.

In order to facilitate picking up of a weld stud with cap nut by a stud welding gun, it may be preferred to provide the cap nut with a coaxial, preferably conical projection at its end opposite the lip.

As a result of its e.g. conically extending projection, a cap nut mounted on a weld stud provides a positive guide to the unit comprising the weld stud and cap nut when entering a stud welding gun, since the conical projection automatically aligns the respective end of the unit coaxially in a suitable receptacle in the stud welding gun. Tilting of the coaxial section of the weld stud in relation to the stud welding gun when the stud is picked up is thus extremely unlikely. Thus coaxial location of the unit comprising the weld stud and cap nut inside the stud welding gun is assured at all times and this leads to a uniform welding quality.

The cylindrical section may be formed as a flange stepped down from the shoulder towards the threaded shank, from which an extension comprising the welding point projects axially. The cylindrical section then has a somewhat larger diameter in relation to the cap nut and can thus be gripped readily by the gripping jaws of the stud welding gun.

BRIEF DESCRIPTION OF THE DRAWINGS

Preferred embodiments of the invention will now be described in greater detail by way of example only with reference to the accompanying drawings in which.

DETAILED DESCRIPTION OF THE DRAWINGS AND PREFERRED EMBODIMENTS

Figure 1:
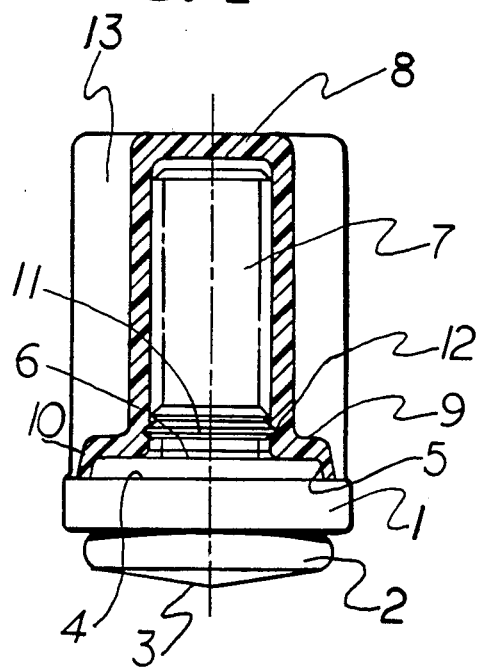
FIG. 1 shows a preferred weld stud together with cap nut screwed thereon, the latter being shown in sectional view on line I—I of FIG. 2.

The assembly illustrated in FIG. 1 comprises a weld stud having a cylindrical section 1 (for gripping by a stud welding gun), to which is joined a short extension 2 which, together with its conical projection 3, forms the subsequent welding point. Next to cylindrical section 1 there is firstly a step 4, from which rises a chamfer 5, and then proceeds to form shoulder 6. Next to shoulder 6 follows threaded shank 7 on to which is screwed cap nut 8. The cap nut 8 forms into a flange 9 at its open end to which is joined a resilient lip 10. Lip 10 tightly abuts level 5 and is stretched by the latter and thus forms a sealing zone over the length of bevel 5 which reliably protects the interior of cap nut 8 against the penetration of dirt, dust or other foreign substances such as, for example, paint. At the end of the thread of threaded shank 7, facing shoulder 6 is ridge 11, which engages into a corresponding annular recess 12 inside cap nut 8, which prevents any undesired loosening of the cap nut screwed on to threaded shank 7.

As can be seen, cylindrical section 1 is of a larger diameter than cap nut 8, so that the gripping jaws of a stud welding gun can reliably establish contact with cylindrical section 1. It is of course possible to incorporate bevel 5 directly into the cylindrical surface of cylindrical section 1, without the arrangement of the shoulder 6 lying between cylindrical section 1 and bevel 5 in accordance with FIG. 1. The arrangement of shoulder 6 also has the advantage that resilient lip 10 can retract radially inwardly in relation to cylindrical section 1, which enhances the grip of the stud welding gun on the cylindrical section.

Figure 2:
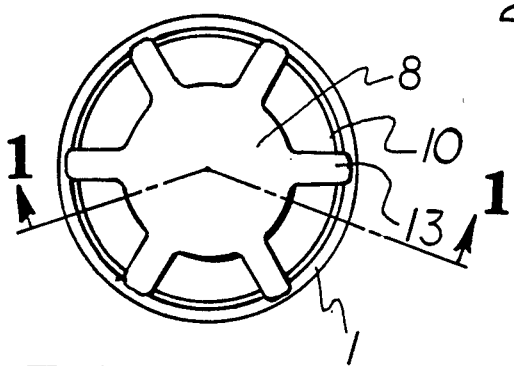
FIG. 2 is a plan view of the assembly of FIG. 1 viewed in a direction towards the closed end of the cap nut.

FIG. 2 depicts the assembly of FIG. 1 in plan view looking at the top of cap nut 8, which is provided with six fins 13 in order to render it more easily accessible. From FIG. 2 can be seen the radial projection of cylindrical section 1 in relation to resilient lip 10.

Cap nut 8 is made of plastics material of sufficient rigidity (material strength) to enable resilient lip 10 to yield when stretched by bevel 5.

Figure 3:
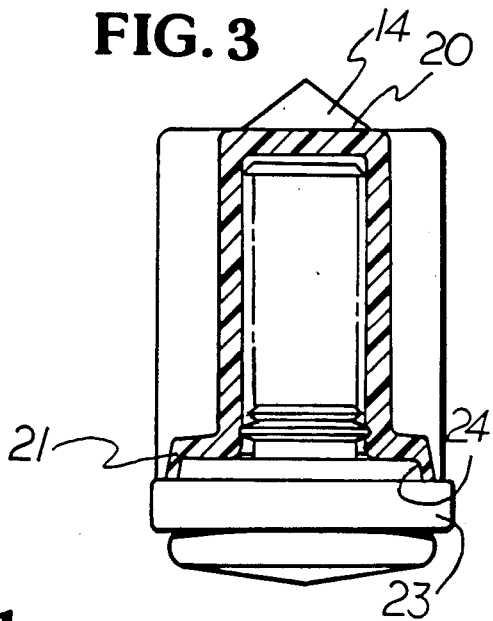
FIG. 3 shows a modified weld stud together with cap nut screwed thereon, the latter being shown in sectional view on line III—III of FIG. 4.

The modified weld stud and cap nut illustrated in FIG. 3 has the same general structure as that illustrated in FIG. 1 and operates in the same way.

Cap nut 20 is provided at its end opposite lip 21 with projection 14, which is formed of plastics and is integral with cap nut 20. Upon entering into a stud welding gun, projection 14 is embraced by a holding arrangement inside the stud welding gun by which the unit comprising the weld stud and cap nut 20 is automatically aligned coaxially with the stud welding gun.

Figure 4:
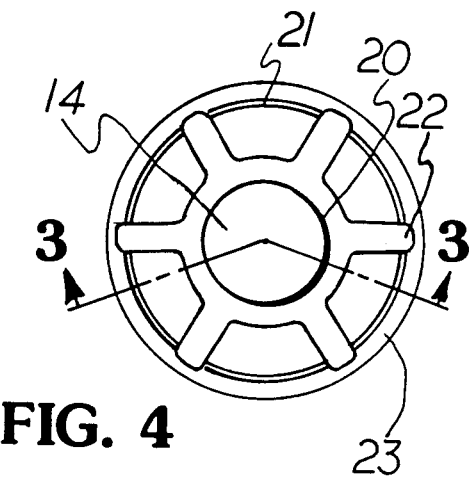
FIG. 4 is a plan view of the assembled unit of FIG. 1 viewed in a direction towards the closed end of the cap nut.

Just as FIG. 2 depicts the plan view of FIG. 1, so FIG. 4 depicts the assembled unit of FIG. 3 in plan view looking at the top of cap nut 20, which is again provided with six fins 22. From FIG. 2 can be seen the radial projection of cylindrical section 23 in relation to resilient lip 21. FIG. 4 also shows conical projection 14 at the end of cap nut 20 opposite resilient lip 21.

Cap nut 2 is moulded integrally with cone 14 from a plastics material of sufficient flexibility or such rigidity to enable resilient lip 21 to yield when stretched by bevel 24.

We claim:

1. A weld stud with a protective cap nut which comprises:
   a weld stud portion having an cylindrical section with a diameter larger than that of said cap nut wherein said cylindrical section can be contacted by gripping jaws of a stud welding gun;
   an extension with a conical projection located on one side of said cylindrical section to form a subsequent welding point;
   a shoulder formed with a chamfer located on the other side of said cylindrical section, opposite said extension, the shoulder having a diameter smaller than the diameter of the cylindrical section; and
   a shank protruding from said shoulder having an externally threaded section and having a ridge axially spaced from the externally threaded section and formed like a thread for engaging an annular recess on the inside of said cap nut; and
   a plastic cap nut portion having an internally threaded section threadably engaged to said weld stud portion and having a cylindrical body with an inside diameter sized to threadingly engage said threaded shank,
   a flange located at an open end of said cap nut to which is attached a resilient lip which stretches to cover the chamfer of said stud when the cap nut is brought into contact with said shoulder, the outer diameter of said lip being smaller than that of said cylindrical section of said weld stud;
   an annular recess inside said cap nut axially spaced from said internally threaded section to engage said ridge on said threaded shank;
   a conical projection located at a closed end of said cap nut opposite said lip wherein said cap nut is automatically aligned coaxially with the stud welding gun as said projection is embraced by a holding arrangement inside the weld gun; and
   fins located circumferentially about said body and sized so as not to protrude beyond the outer diameter of said cylindrical section of said stud.

2. The weld stud of claim 1 wherein said plastic material of said cap has sufficient material strength to enable the resilient lip to yield when stretched by said chamfer.

3. The weld stud of claim 1 wherein six fins are provided.

* * * * *